United States Patent [19]

Blair

[11] 3,850,426

[45] Nov. 26, 1974

[54] A CARD READER HAVING AUTOMATIC CARD POSITIONING MEANS

[75] Inventor: Bryce Wilson Blair, Hershey, Pa.

[73] Assignee: AMP Incorporated, Harrisburg, Pa.

[22] Filed: Feb. 11, 1972

[21] Appl. No.: 225,631

Related U.S. Application Data

[63] Continuation of Ser. No. 48,941, June 22, 1970, abandoned, which is a continuation of Ser. No. 655,941, July 25, 1967, abandoned.

[52] U.S. Cl. .......... 271/238, 235/61.11 R, 271/243

[51] Int. Cl. .......... B65h 9/10

[58] Field of Search .......... 271/53, 58, 60, 44, 56, 271/61, 74, 238, 243; 235/61.11 R, 61.11 D, 61.11 E, 61.11 C; 340/174.1 C; 226/34–39; 274/4 R, 4 J; 35/35 R

[56] References Cited

UNITED STATES PATENTS

| | | | |
|---|---|---|---|
| 3,034,643 | 5/1962 | Keller et al. | 235/61.12 R X |
| 3,200,194 | 8/1965 | Rabinow | 178/6.8 X |
| 3,222,502 | 12/1965 | Husted | 235/61.11 C |
| 3,349,369 | 10/1967 | Jensen | 235/61.11 D |
| 3,371,929 | 3/1968 | Shebanow | 271/74 |
| 3,433,932 | 3/1969 | Rolke | 235/61.11 R |
| 3,470,358 | 9/1969 | Sallach | 235/61.11 C |
| 3,521,033 | 7/1970 | May | 235/61.11 E |

OTHER PUBLICATIONS

Bowers et al., "Credit Card Reader," IBM Technical Disclosure Bulletin, V. 9, No. 12, May, 1967.

*Primary Examiner*—Thomas J. Sloyan
*Attorney, Agent, or Firm*—Gerald K. Kita

[57] ABSTRACT

The disclosure relates to a card reader imprinter for coding information onto invoices and the like from data cards, especially credit cards having coded information thereon. The data card is placed into the machine and, automatically, upon insertion therein, causes the machine to operate and provide predetermined data on an invoice taken from the card as well as other data of predetermined nature which can also be added to the invoice or other indicia receiving member in well known manner. The disclosure further includes means for forcing the data or credit cards into proper reading position upon entry thereof part way into the machine so that the data card will always be in proper reading position when a reading signal is provided. The card reader imprinter further includes means to eject the data card therefrom upon the completion of a reading so that the card can be easily removed from the imprinter.

4 Claims, 6 Drawing Figures

A CARD READER HAVING AUTOMATIC CARD POSITIONING MEANS

This is a continuation of application Ser. No. 48,941 filed June 22, 1970, and now abandoned, which was a continuation of application Ser. No. 655,941 filed July 25, 1967, and now abandoned.

This invention relates to a card reader and more particularly to an improvement in card reader imprinters for properly and automatically inserting data cards or credit cards to be read into the card reader and ejecting same from the card reader imprinter upon completion of a reading.

Data cards and especially credit cards having coded information thereon are being used in ever increasing numbers in the business world due to the speed of operation thereof in automated machines as well as the reduced risk of error provided thereby. Card readers and card reader imprinters which imprint information onto invoices have been known in the prior art for use with such credit cards and the like in the manner above described. One such typical card reader imprinter is fully set forth in an application for letters patent of Lindsay Carlton Friend for Card Reader Imprinter, Ser. No. 545,391, filed Apr. 26, 1966, and assigned to the assignee of this application, which is incorporated herein in its entirety by reference.

Card reader imprinters of the above described type have found great success in the industry. However, such card reader imprinters require that the data or credit card be fully inserted into proper reading position before an accurate reading can be taken and further require that the operator proceed to manually withdraw the card from the reader after the completion of an imprinting operation. These problems subject prior art card reader imprinters to a certain degree of inaccuracy in operation and also do not provide for maximum utilization of speed of operation capable of present day machines.

In accordance with the present invention, the above problems of the prior art are overcome by the use of a spring actuated lever mechanism which acts to drive a data or credit card into the fully inserted position after a partial insertion thereof, this operation being automatic and providing for accurate lining up of the data card for substantial trouble free and error free reading of data. Also in accordance with the present invention, there is provided an ejection mechanism whereby the data or credit card is partially ejected from the reader mechanism after the completion of a reading and imprinting operation so that the operator can then easily withdraw the card from the machine in preparation for the next operation thereof.

It is therefor an object of this invention to provide a card reader imprinter which accurately lines up data cards therein for accurate reading.

It is a further object of this invention to provide a card reader imprinter for automatically positioning a data or credit card in proper reading position therein after the card has been partially inserted.

It is a still further object of this invention to provide an automatic ejection mechanism for a card reader imprinter for ejecting a data or credit card therefrom upon completion of a reading and/or imprinting operation within the imprinter.

The above objects and still further objects of this invention will immediately become apparent to those skilled in the art upon a reading of the following detailed description when taken in conjunction with the drawings in which there is shown and described an illustrative embodiment of the invention. It is to be understood, however, that this embodiment is not intended to be exhaustive or limiting of the invention but is given for purposes of illustration in order that others skilled in the art may fully understand the invention and the principles thereof and the manner of applying it in practical use so that they may modify it in various forms, each as may best be suited to the conditions of a particular use.

Figure 1:
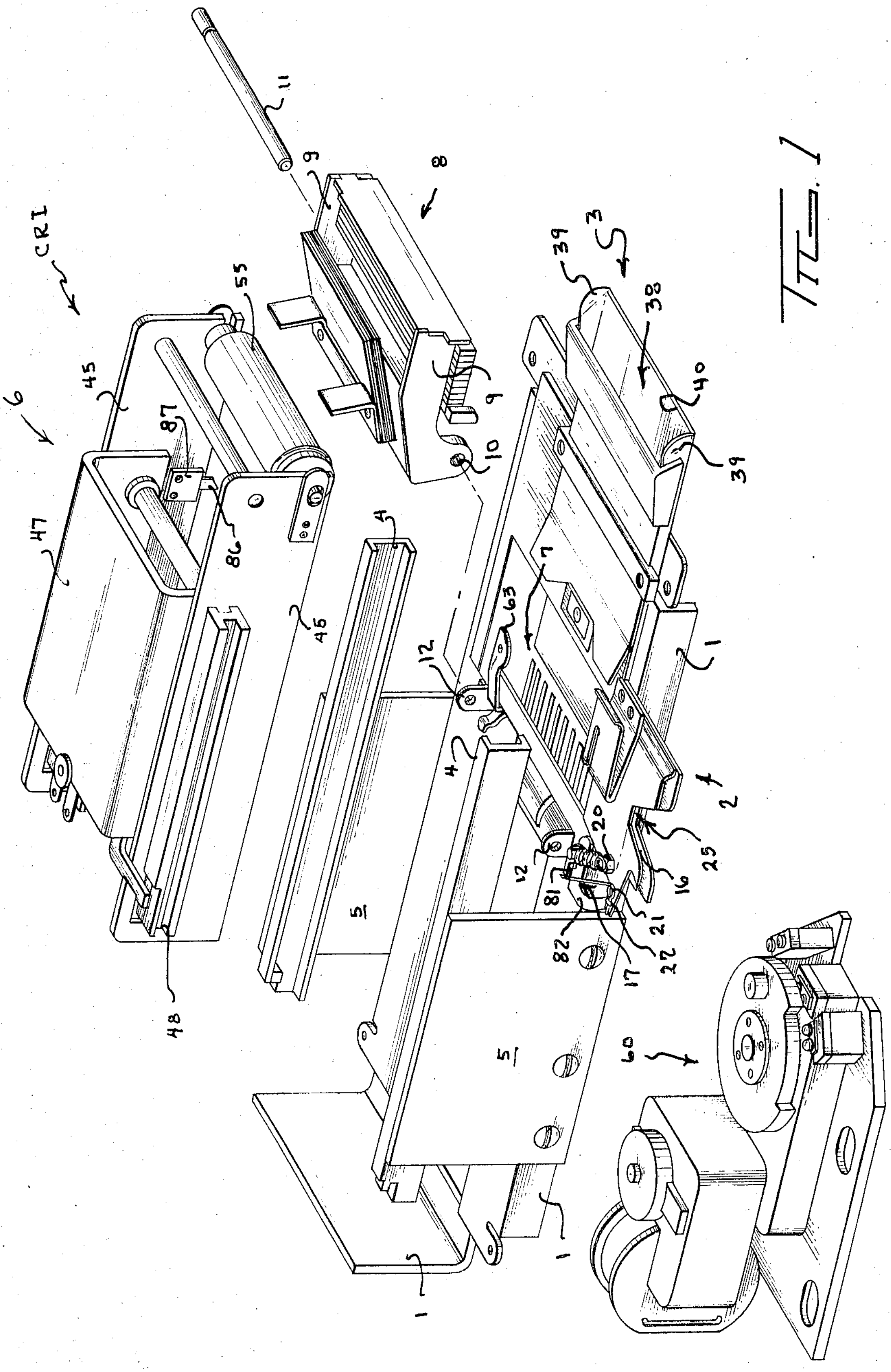
FIG. 1 is an exploded view of a card reader imprinter in accordance with the present invention.

Turning now to the drawings, FIG. 1 illustrates a card reader imprinter CRI with the cover therefor removed and in an exploded view. Card reader imprinter CRI comprises an L-shaped base member 1 with the long leg of the L having disposed thereon a data card receiving section 2 and a slip, copy or invoice receiving section 3. A pair of carriage carrying members 4 are secured to a pair of side plates 5 which are secured to the long leg of the L-shaped base member 1. A carriage 6 is carried by the carriage carrying members 4 and is movable therealong.

A contact assembly for reading the information on data cards has a stationary contact section 7 disposed in the data card receiving area 2 and a movable contact section 8 which is movable relative to the section 7. Arms 9 are secured to the ends of movable contact section 8 and are pivotally connected by apertures 10 through a shaft 11 secured in the projections 12 of the reading card area 2. The contact assembly is of the type disclosed in U.S. Pat. application, Ser. No. 441,179, filed Mar. 19, 1965, and assigned to the present assignee which provides contact members having a redundant capability.

Card receiving area 2 is provided with an entrance 16 for receiving of data cards 80. The card reading section 2 further includes a card positioning means 17 which is shown more clearly in FIGS. 2 through 5. The card positioning means comprises an extending finger 18 which extends into the path of travel of the data card 80. The extending finger 18 is connected to member 81 which is connected to a spring member 21 which is affixed to a flange member 22 of the card receiving member 2. The spring member 21 biases the member 81 toward the path of travel of the data card 80 or in a clockwise direction as shown in the figures.

Figure 2:
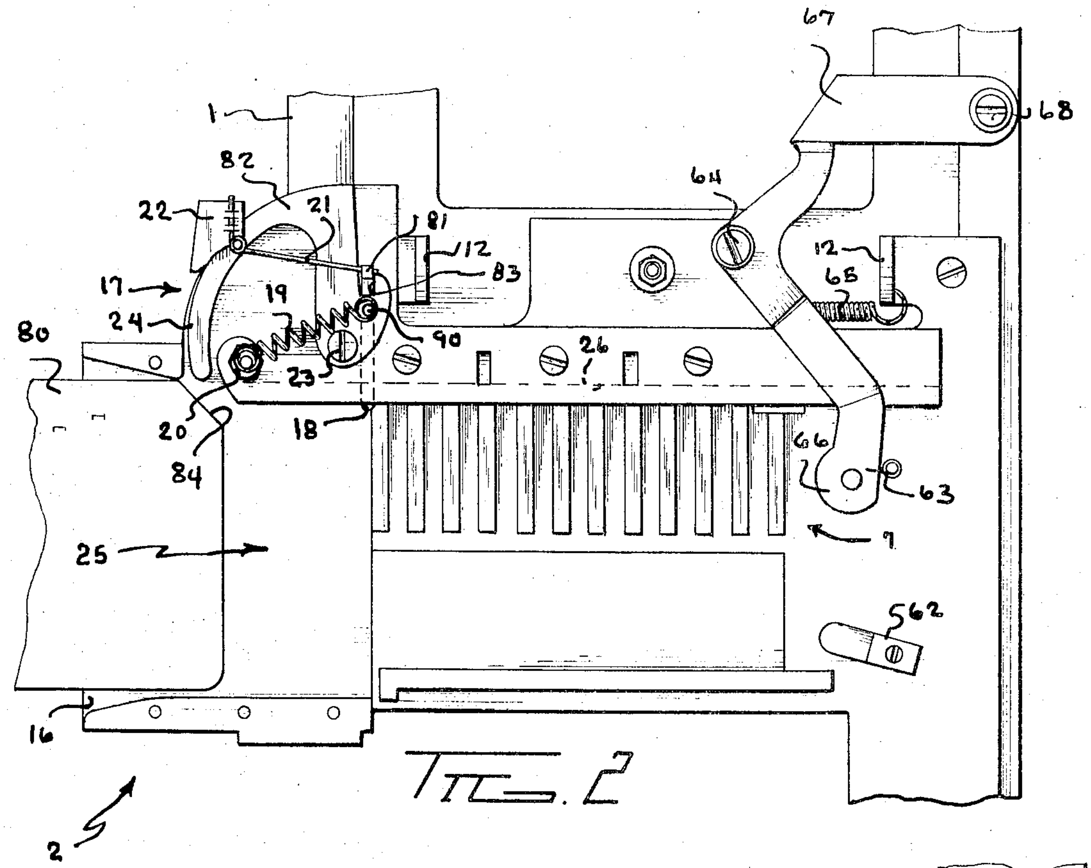
FIG. 2 is a cross sectional view of the card reader imprinter of the present invention with a credit card beginning to be inserted.

Also secured in the card reading section 2 is a rotatable member 82 which is rotatable about the pivot 23 and which has an extending finger portion 24. The member 82 also includes a slot 83 into which the member 81 can be moved during certain portions of the operation of the card positioning means 17 (to be described hereinbelow). The spring member 19 is secured to the base of the card reader by a bolt and nut 20 and to the member 82 by a securing means 90 and biases the member 82 for counterclockwise rotation about the pivot 23. During the non operating period, as shown in FIG. 2 the member 81 will be positioned within the slot 83 and thereby block the member 82 against counterclockwise rotation due to the biasing of the spring member 19. The member 83 is held in position due to the clockwise action provided by the spring member 26. In this position, the end portion of the finger 24 extends slightly into the path of the data card 80 or slightly inwardly of the side wall 21 which forms a part of the data card path.

Copy slip receiving section 3 has an entrance 38 provided with a guide member 39 extending thereacross which has a beveled surface in order to facilitate the insertion of a copy slip therein. The section 3 includes a floor 40 and a wall (not shown) to properly position the copy slip. The section 3 also included a switch (not shown) which is better described in the above mentioned co-pending application Ser. No. 545,391 and which, in conjunction with the switch 35, will proceed to operate the card reader imprinter as described in the above mentioned co-pending application.

The carriage 6 includes sides 45 and a cross member 47 extending between sides 45. Each of the sides 45 has a channel 48 formed therein for engagement with respective carriage-carrying members 4 for carrying carriage 6 and allowing carriage 6 to move therealong. Also affixed in the carriage member 6 is a printing roller 55.

Figures 5, 6:
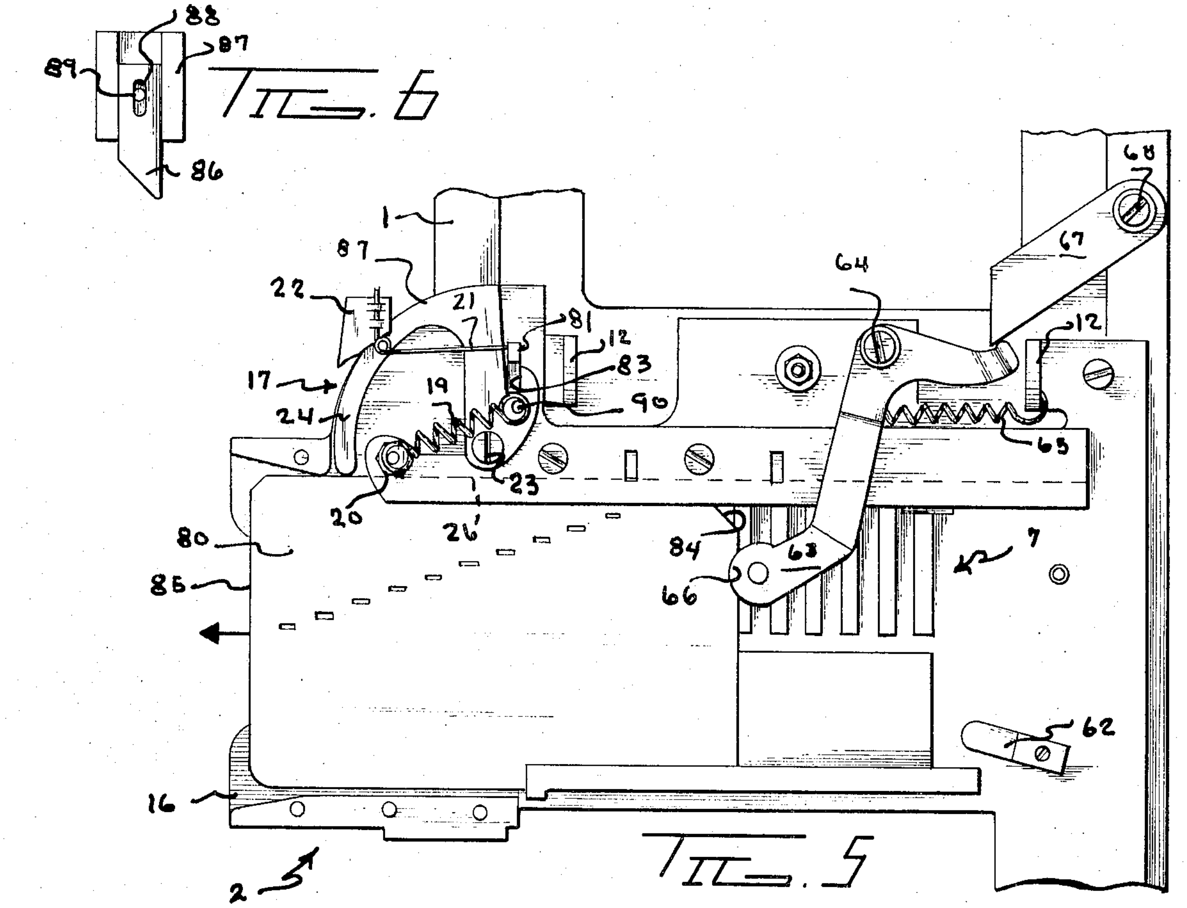
FIG. 5 is a view the same as FIG. 2 of the card reader imprinter of the present invention with the data card fully ejected.
FIG. 6 is an enlarged view of the pawl mechanism of FIG. 1.

Positioned in the carriage 6 is a pawl member 86 which is shown enlarged in FIG. 6 and which is positioned behind the print roller 55. The pawl 86 is affixed to the carriage 6 by a block 87, the pawl 86 including a slot 88 therein and a screw type member 89 which is positioned through the slot 88 and secured to the block 87 to permit upward and downward travel of the pawl 86 thereon. The remainder of the carriage structure (not shown) is fully described in the above mentioned co-pending application and forms no part of the present invention.

The motor and accompanying structure for operating the card reader imprinter is shown at 60 and is also fully described in the above identified co-pending application.

Figure 3:
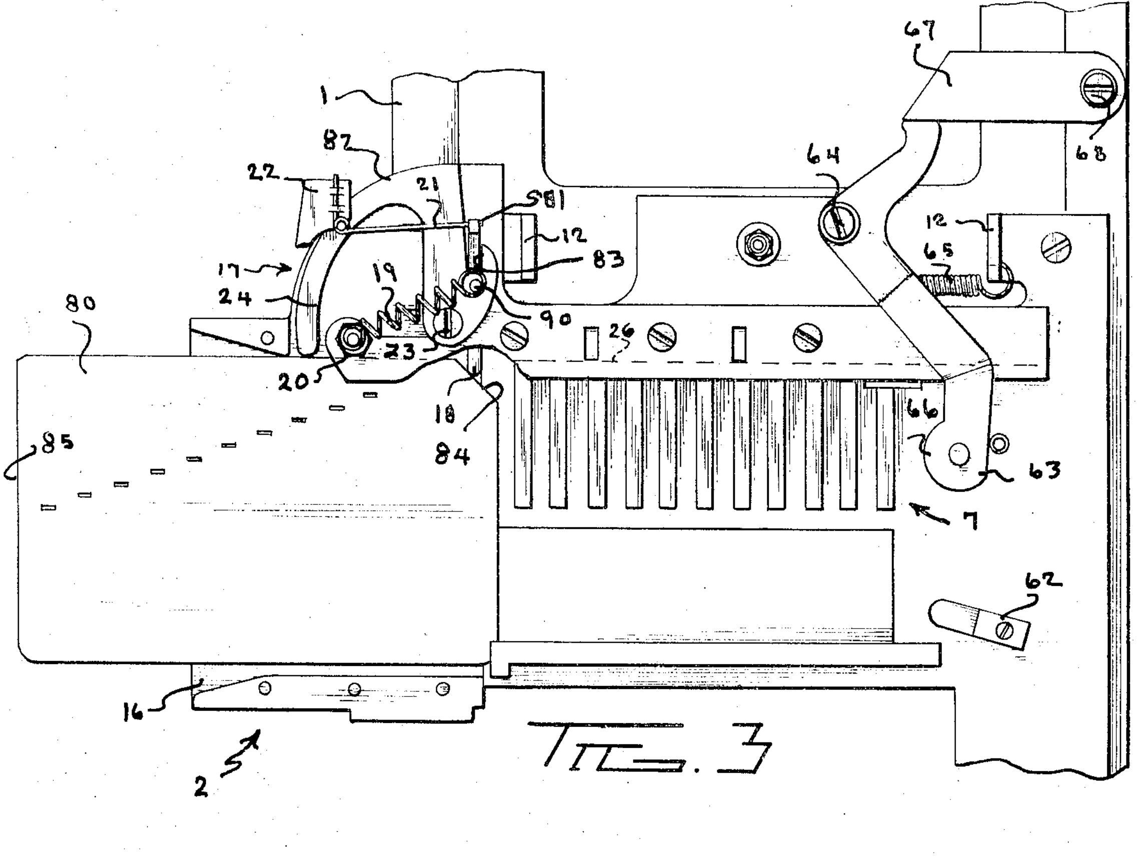
FIG. 3 is a view identical to FIG. 2 with a data card part way inserted into the card reader imprinter.
Figure 4:
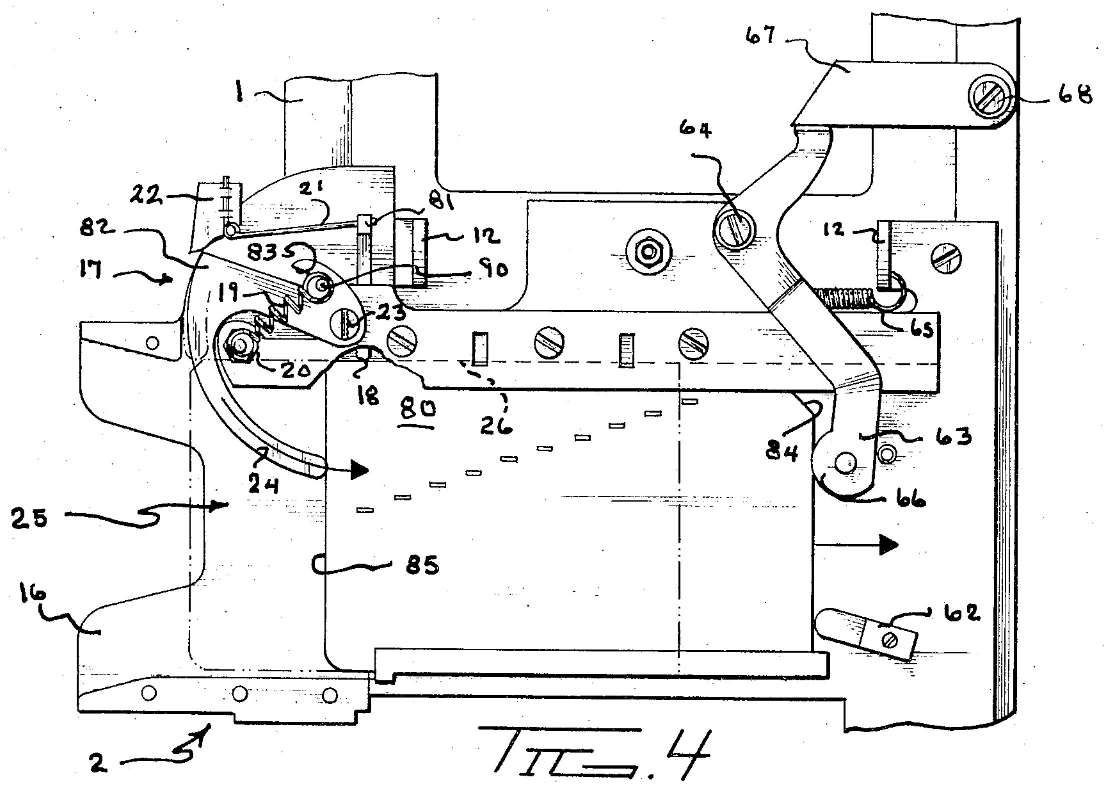
FIG. 4 is a view the same as FIG. 2 with a data card completely inserted into the card reader imprinter.

At the downstream end of the section 7 there is provided a stop 62 (better shown in FIGS. 2 through 5), which, along with the finger 24, acts to properly position the data card for reading within the card reader imprinter. Also positioned at the downstream end of the section 7 is a lever 63 which is pivoted at the pivot point 64 and is biased in its extreme counterclockwise position by a spring member 65 when no external force is being applied to the lever 63. The flanged portion 66 of the lever 63 will abut against a data card when the data card is in its proper reading position. This is best shown in FIG. 4. After the proper reading of a data card, a lever 67, pivoted about the pivot 68 due to the forward movement of the pawl 86 along with carriage 6, is caused to rotate in a counterclockwise direction, as best shown in FIG. 5. This causes the lever 63 to rotate about the pivot 64 in a clockwise direction to force the data card out of the data reader imprinter.

It will be noted that the data card 80 includes a beveled edge 84 which is positioned at the forward end of the card and adjacent the wall 26 when the card is being inserted. As the card continues to be inserted inwardly into the card receiving channel 25 in the direction shown by the arrow, the beveled edge 84 will initially strike the finger portion 24 (FIG. 3) and cause the member 82 to rotate slightly in a clockwise direction. This rotation will remove any frictional force upon the member 81 which is caused by the member 82 due to the counterclockwise bias thereon and allow for freedom of movement of the member 81 when a proper force is applied thereto.

As the card 80 is pushed farther into the channel 25, (FIG. 3), the beveled edge 84 strikes the extending finger 18 and drives the finger in a counterclockwise direction relative to the attached portion of the spring member 21 and thereby causes the member 81 to rotate in the same counterclockwise direction and out of the groove 83. This movement frees the member 82 for counterclockwise rotation due to the bias provided by the spring member 19. However, as seen more clearly in FIG. 3, the finger portion 24 is at this time unable to rotate in a counterclockwise direction because it strikes the card 80 which is then positioned in the normal path of travel of the finger 24. As the downstream edge 85 of the card 80 is moved past the finger 24 (FIG. 4), the finger is then able to continue rotation in a counterclockwise direction under the bias of the spring member 19 and force the data card 80 forward into the channel 25 and against a stop 62. In this position, the data card 80 is properly positioned for accurate reading.

To more clearly and fully understand the operation of the card reader imprinter of the present invention, a typical operation of the machine will now be provided.

The data card is initially inserted into the channel 25 as shown in FIG. 2. It will be noted that in FIG. 2 all of the mechanisms are in their normally biased condition and have not undergone any change due to insertion of the data card. Referring now to FIG. 3, the data card has been inserted to the extreme position prior to the inception of operation of the mechanism 17. A slightly further insertion of the data card 80 will push the finger 18 inwardly due to the bevel 84 on the data card 80 and force the finger 18 inwardly against the bias of the spring member 21 of the mechanism 17 to move the member 81 in a counterclockwise direction and unlock the member 82 for operation. At this point, the finger 24 will be biased to move into the channel 25 to abut the data card but is arrested from further motion due to the data card being positioned in the channel.

A slightly further insertion of the data card (FIG. 4) sets the mechanism 17 into operation whereby the finger 24 is now forced to rotate in a counterclockwise direction about the pivot 23 and continues to force the data card 80 into the channel 25 and into the proper reading position whereby the data card is positioned between the finger 24, the stop 62 and against the flange 66. When the data card is in the position shown in FIG. 4, the reading will take place as described in the above mentioned co-pending application Ser. No. 545,391, whereby the print roller 55 will be moved toward the right as shown in FIG. 1 and cause printing to take place. This movement of the print roller forces the pawl 86 to move against and to rotate the lever 67 about the axis 68 and rotate the lever 63 about the axis 64 to propel the data card outwardly against the finger 24. This movement against the finger 24 causes said finger to rotate in a clockwise direction, as shown in FIG. 5, and moves the data card outwardly where it can be removed from the imprinter by the operator. At this point, the mechanism 17 will again become biased and locked in the position shown in FIG. 2 and the machine is again ready for operation. The carriage 6 will ride back to its initial position and the pawl 86, due to the bevel thereon will ride up via the screw member 89 and thereby ride over the lever 67 to its rest position.

Though the invention has been described with respect to a specific preferred embodiment thereof, many variations and modifications thereof will immediately become apparent to those skilled in the art. It is therefore the invention that the appended claims be interpreted as broadly as possible in view of the prior art to include all such variations and modifications.

What is claimed is:

1. In a card reader, a card receiving channel into which a card to be read may be inserted, said card having a leading edge and a trailing edge both being substantially transverse to the axis of motion of said card, positioning means normally out of engagement with the card movable against the trailing edge of the card for moving it in its plane to position it in a predetermined reading locating in the channel, means for operating the positioning means, means for locking said positioning means in an inoperative position adjacent the inlet of the channel, and means engageable by the leading edge of the card to release said locking means whereby said positioning means is freed to move and position the card under control of the operating means, said means engageable by the leading edge comprising a finger extending laterally into the channel, the finger being mounted for movement laterally of the channel and in the plane thereof to release the locking means, the card being substantially rectangular in shape with one corner thereof being removed to form a camming surface for moving the finger.

2. In a card reader, a card receiving channel having an inlet into which a card to be read may be inserted edgewise, positioning means normally out of engagement with the card movable against the trailing edge of the card for moving it in its plane to position in a predetermined reading location in the channel, means for operating the positioning means, means for locking said positioning means in an inoperative position out of the path of the card being inserted in the channel, and means engageable by the leading portion of the card as it is inserted in the channel, to release said locking means, whereby said positioning means is freed to move the card into said location and to maintain it therein under control of the operating means, said positioning means comprising means swingable about a pivot, located exteriorly of the channel, in a direction to move the card along the channel, the means for operating the positioning means comprising means normally biasing said positioning means for movement toward and along the channel, and further including, means at said location operable to return the card to the inlet of the channel and to cause the said trailing edge of the card to return the positioning means against the force of the biasing means into locked position.

3. In a card reader according to claim 2 wherein the means for returning the card to the inlet of the channel comprises movable means abutting the said leading edge of the card.

4. In a card reader, a card receiving channel having an inlet into which a card to be read may be inserted edgewise, positioning means normally out of engagement with the card movable against the trailing edge of the card for moving it in its plane to position it in a predetermined reading location in the channel, means for operating the positioning means, means for locking said positioning means in an inoperative position out of the path of the card being inserted in the channel, and means engageable by the leading portion of the card as it is inserted in the channel, to release said locking means, whereby said positioning means is freed to move the card into said location and to maintain it therein under control of the operating means, said means engageable by the leading edge comprising a finger extending laterally into the channel, and further wherein the finger is mounted for movement laterally of the channel and in the plane thereof to release the locking means, the card being substantially rectangular in shape with one corner of a leading edge removed to form a camming surface for moving the finger.

* * * * *